US006804044B2

(12) United States Patent
Van Der Veer (10) Patent No.: US 6,804,044 B2
(45) Date of Patent: Oct. 12, 2004

(54) NARROW BANDWIDTH, PICO-SECOND, BETA BARIUM BORATE-MASTER OSCILLATOR POWER AMPLIFIER SYSTEM AND METHOD OF OPERATION OF SAME

(75) Inventor: Wytze Eeuwke Van Der Veer, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 334 days.

(21) Appl. No.: 10/052,625

(22) Filed: Jan. 18, 2002

(65) Prior Publication Data

US 2003/0137719 A1 Jul. 24, 2003

(51) Int. Cl.[7] .............................................. G02F 1/39
(52) U.S. Cl. ...................................................... 359/330
(58) Field of Search ................................. 359/326–332

(56) References Cited

U.S. PATENT DOCUMENTS 4,349,907 A * 9/1982 Campillo et al. ............. 372/92
5,663,973 A * 9/1997 Stamm et al. ................ 372/20
5,781,571 A * 7/1998 Nabors et al. ................ 372/21

FOREIGN PATENT DOCUMENTS

JP 10-170967 * 6/1998 ............ G02F/1/39

OTHER PUBLICATIONS

V. Petrov et al, "Parametric Generation of 1–ps Pulses Between 5 and 11 um with a ZnGeP2 Crystal", IEEE Journal of Quantum Electronics, vol. 33, No. 10, Oct. 1997, pp. 1749–1755.*

* cited by examiner

Primary Examiner—John D. Lee
(74) Attorney, Agent, or Firm—Daniel L. Dawes; Myers Dawes Andras & Sherman LLP (57) ABSTRACT

A synchronously pumped optical parametric oscillator generates pulses with duration 25 ps and repetition rate of 10 Hz. The bandwidth of the radiation is 1.36 cm$^{-1}$, close to the Fourier limit. A single pulse from each oscillator is further amplified with an optical parametric amplifier obtaining pulse energies up to 3.7 mJ. This source can be tuned between 410 nm-2000 nm. The system is not a laser but an optical parametric oscillator where amplification is obtained in a parametric process rather than by population inversion. The oscillator is pumped by a pulse train from a Nd:Yag laser. In each roundtrip the bandwidth of the radiation is reduced by a grating-mirror assembly. After a number of roundtrips a close to ideal pulse is obtained. This single pulse is then amplified by an optical parametric amplifier obtaining a single tunable narrow bandwidth pulse with a duration of about 25 ps.

32 Claims, 3 Drawing Sheets

NARROW BANDWIDTH, PICO-SECOND, BETA BARIUM BORATE-MASTER OSCILLATOR POWER AMPLIFIER SYSTEM AND METHOD OF OPERATION OF SAME

BACKGROUND OF THE INVENTION

1. Field of the Invention

The invention relates to pico second laser sources and in particular to optical parametric oscillators for producing pico second light pulses.

2. Description of the Prior Art

Kafka, "Synchronously Pumped Subpicosecond Optical Parametric Oscillator," U.S. Pat. No. 5,847,861 (1998) shows in FIG. 1A, a cavity defined by highly reflective mirror 12, highly reflective mirror 14, highly reflective mirror 16, curved mirrors 18 and 20, highly reflective mirror 22, and output coupler 24. Positioned on the back side of highly reflective mirror 16 is piezoelectric transducer 26. A high power, one-half Watt or higher pumped source 42 generates subpicosecond pulses in the range of 700 to 900 nm. Mirror 44 focuses pumped beam 46 into the OPO cavity.

Output beam 46 is directed by fold mirrors 48, 50, 52, and focusing mirror 44 along an optical path 54, through curved mirror 18, which is transmissive at the pump radiation wavelength in the range of from about 700 to 900 nm.

Edelstein et.al., "Broadly Tunable High Repetition Rate Femtosecond Optical Parametric Oscillator," U.S. Pat. No. 5,017,806 (1991) shows in FIG. 1, a continuous wave, femtosecond optical parametric oscillator 10 incorporating a thin KTP crystal 12 located in the cavity of a CPM dye laser 14. The OPO ring cavity 24 is formed by two curved focusing mirrors 50 and 52 positioned on opposite sides of the crystal 12 and two flat mirrors 54 and 56. One of the flat mirrors, such as mirror 54, is mounted on a piezoelectric transducer 58 for fine adjustment of the length of the OPO cavity. The crystal 12 acts as a frequency converter, and thus responds to the input energy from the pumping beam of the CPM laser to produce output beams at two longer wavelengths, one represented by the signal beams 20 and 22 and the other represented by the idler beams 16 and 18.

Guyer et.al., "Tunable Pulsed Single Longitudinal Mode Optical Parametric Oscillator," U.S. Pat. No. 5,235,456 (1993) shows in FIG. 1, the optical parametric oscillator 2 as including a pump laser source that transmits pulses of optical energy along a pump path 4. The optical parametric oscillator 2 comprises a first means for reflecting optical energy 10, that may be, for example, an optical element such as a back cavity mirror. The first means for reflecting 10 reflects optical energy along the reflective optical path 8 that it receives along the reflective optical path 8. The oscillator 2 also comprises a means for diffracting optical energy 12 that may be, for example, an optical element such as a glancing incidence grating.

The means for diffracting 12 diffracts a first portion of the optical energy directed along the reflective optical path 8 by the first order of interference to a diffraction path 14. The means for diffracting 12 reflects a second portion of the optical energy directed along the reflective optical path 8 along an output optical path 16.

Cheng et.al., "Tunable Optical Parametric Oscillator," U.S. Pat. No. 5,053,641 (1991) shows in the embodiment of FIG. 5, a singly resonant oscillator comprised of two identical dichroic mirrors 62 and 64 to define a cavity with a BBO crystal in the cavity.

Campillo et.al., "Broadly Tunable Picosecond IR Source," U.S. Pat. No. 4,349,907 (1982) shows in FIG. 1, a repetitively flashlamp-pumped mode-locked laser emits a train of 40 ps duration pulses on each flashlamp cycle. One beam is directed along a cut lithium niobate crystal, which acts as a traveling-wave parametric oscillator. The emission from the first crystal is diffracted by a grating and the desired spectral and spatial component is injected into a second nearly degenerate 2 cm long LiNbO3 amplifier located in the second pump beam line.

The prior art could generate narrow bandwidth picosecond pulses only by first generating narrow bandwidth pulses with a tunable pulse with a nano-second laser, and then amplifying this pulse with a second pico-second laser. This is a relatively complex and expensive optical system. What is needed is a more integrated system by which narrow bandwidth picosecond pulses can be generated.

BRIEF SUMMARY OF THE INVENTION

An illustration of one application of the invention is its use in gas phase ultra trace detection methods based on resonance enhanced multi photon ionization time-of-flight mass spectrometry for a number of atmospherically relevant compounds. The target molecules include halogen oxides, e.g., HOCl, HOBr, ClOOCl, as well as radical species, e.g., $CH_3OO$ and $HO_2$. All these molecules exhibit strong, continuous, broad absorptions in the near UV/VIS region, i.e., dissociate rapidly when excited in this wavelength range. However, a number of relatively long lived Rydberg states are expected closely below the ionization threshold. A two-photon excitation of these levels and consecutive ionization is expected to be a sensitive and selective probe for these molecules. This spectroscopic approach both requires short pulses to compete with the dissociative processes and a narrow bandwidth to obtain high spectroscopic selectivity.

To obtain the radiation required for these measurements, a synchronously pumped picosecond optical parametric oscillator, OPO, system is constructed that produces near-Fourier limited pulses with duration 25 ps. A single pulse produced by this oscillator is amplified in an optical parametric amplifier, OPA, stage. The pulse train pumping the OPO is obtained by "leaking" on each round trip a part of the pulse that is formed in the oscillator of a mode locked Nd:Yag laser. This pulse train is then amplified in an additional double pass Nd:Yag amplifier. Next, the third harmonic of the pulse train is generated and directed into the beta-barium borate, BBO, crystals of the OPO. While the illustrated embodiment describes BBO crystals, it must be explicitly understood that the invention includes all optical crystals which are equivalent thereto or substitutes for BBO, such as lithium triborate (LBO) or potassium titanyl phosphate (KTP). For example, various crystal materials discussed in V. G. Dmitriev et.al., "Handbook of Nonlinear Optical Crystals", 3d Revised Ed. (Springer 1999) may be freely substituted as equivalent to the BBO crystals described in the illustrated embodiment. The oscillator is limited on one side with flat mirror, and with a gazing incidence grating and tuning mirror assembly on the other side. The 0th order reflection of the grating is directed into an OPA, which is comprised of a BBO crystal. The OPA is pumped by a single pulse tunable near to Fourier limited pulse. The system of the illustrated embodiment is comprised of two of these OPO-OPA chains, making it particularly suitable for REMPI and pump-probe measurements. However, it must be understood that the invention can be realized in many different applications and specifically includes subportions of the illustrated embodiment.

The pump laser and the construction of the pulse train amplifier, the OPO and the OPA are disclosed below. Also measurements of the bandwidth, of the temporal behavior of the oscillator versus pump intensity and power gain in the OPA are presented to validate the system.

More particularly, the invention is defined as an apparatus for generating narrow bandwidth picosecond optical pulses comprising a pump laser; an optical parametric oscillator pumped by a pump pulse train generated by the pump laser; and an optical parametric amplifier having an input coupled to an output of the optical parametric oscillator and pumped by a single pulse from the pump laser. The optical parametric oscillator comprises an optical cavity comprised of a grating-mirror termination on one end of the cavity and with optically nonlinear active media and a cavity mirror on an opposing end of the cavity.

The grating-mirror termination on one end of the cavity is comprised of a grazing incidence grating and a tuning mirror. The grating and mirror are arranged with respect to each other so that a diffracted first order is reflected back from the mirror to the grating and into the cavity. In the illustrated embodiment the grazing incidence grating has a periodicity of about 1800 grooves/mm, and is inclined at an approximately 10° angle with respect to the axis of the cavity. The groove density or grating constant can be chosen according to the center of the tuning range for the apparatus. The grazing incidence grating has a blaze optimized for grazing incidence to maximize a first grating order of diffraction.

The tuning mirror is rotatable about a center defined about the grating so that wavelength of the cavity can be adjusted without changing the optical length of the cavity.

The pump laser introduces a train of pulses into the optical parametric oscillator of sufficient strength to trigger a multiple number of round trips of pulses in the cavity of the optical parametric oscillator in which each reflection of a pulse from the grating-mirror termination narrows the bandwidth of the pulse.

The cavity of the optical parametric oscillator further comprises a concave mirror, R=75 cm, to image light transmitted to and received from the grating-mirror termination from the opposing end of the cavity to increase stability of the cavity and to lower the threshold of oscillation. The wavefront of the light at the end of the cavity is flattened relative to the wavefront at the center of the cavity.

The grating-mirror termination couples a $0^{th}$ order diffraction of light from the cavity of the optical parametric oscillator into the optical parametric amplifier.

The pump laser generates a single pulse, which is input into the optical parametric amplifier to coincide with the last pulse of a pulse train output by the optical parametric oscillator and coupled into the input of the optical parametric amplifier.

The optically nonlinear active media is comprised of at least one BBO crystal, and preferably of a pair of BBO crystals arranged with respect to each in a walk-off compensating arrangement to extend power capability of the optical parametric oscillator by increasing the optical gain within the oscillator. Each BBO crystal is independently rotatable to adjust an angular orientation of each BBO crystal in the cavity.

The optical parametric oscillator and optical parametric amplifier in combination generate a pulse having a bandwidth characterized by a Fourier limit with the bandwidth of the generated pulse being near the Fourier limit.

The invention further comprises a method for generating a narrow bandwidth picosecond optical pulse comprising the steps of generating a pump laser pulse train; pumping an optical parametric oscillator by the pump pulse train; generating a pulse train output with a narrowed bandwidth and picosecond pulse width from the optical parametric oscillator by use of a grating-mirror termination on one end of a cavity in the optical parametric oscillator and a cavity mirror on an opposing end of the cavity with optically nonlinear active media therebetween; pumping an optical parametric amplifier having an input coupled to an output of the optical parametric oscillator; and outputting the narrow bandwidth picosecond optical pulse from the optical parametric amplifier.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

The Pump Laser And Pulse Train Amplifier

Figure 1:
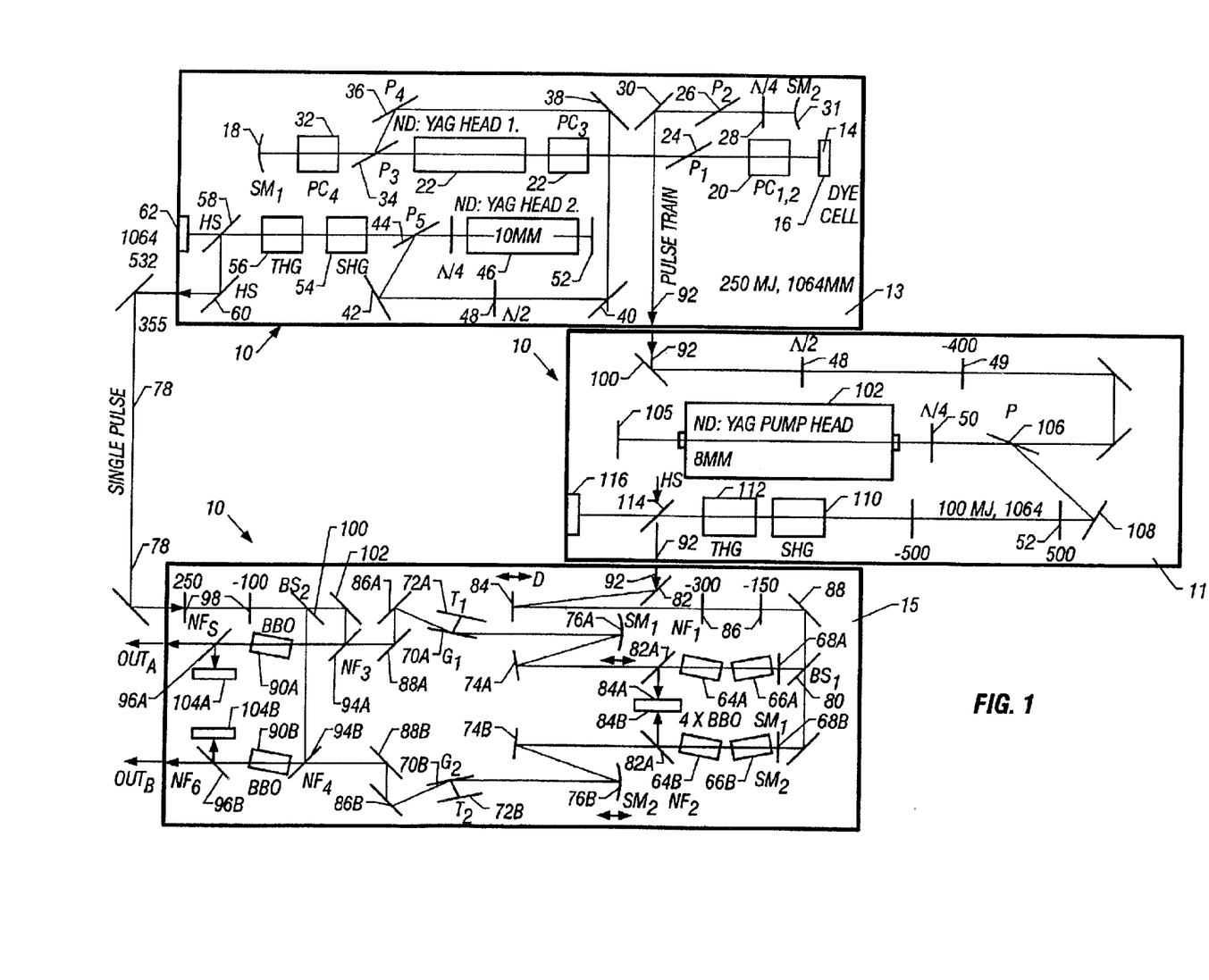
FIG. 1 is a simplified block diagram of the system comprising a mode-locked Nd:Yag laser, a pulse train amplifier and a pair of OPO-OPA's. The Ekspla PL2143B mode locked Nd:Yag laser employs a saturable absorber, a Pockel's cell, a polarizer, a spherical mirror, and a harmonic separator. An additional output for the pulse train is supplied via mirror. The pulse train is amplified with a double pass Nd:Yag amplifier. Also depicted is the OPO and OPA combination 15 of the invention showing a beam splitter, grating, tuning mirror, notch filter which is reflective for 355 nm and transparent 410 to 2000 nm, a spherical mirror, and a delay line. All BBO crystals in the illustrated embodiment have dimensions 4×6×12 $mm^3$.

The illustrated embodiment is closely integrated with a commercial, mode-locked pico-second Nd:Yag laser system generally denoted by reference numeral 13 in FIG. 1, shown here as an Ekspla PL2143B. A simplified block diagram of this laser system 13 is shown in FIG. 1. The Nd:Yag crystal in head 12 is pumped with a flash lamp (not shown), enabling the cavity to build up an oscillation. The cavity in head 12 is limited by a dye cell 14 and a mirror 16 on the left hand side and a concave spherical mirror 18 on the right hand side. The dye cell 14 causes the mode locking effect, forming a single pulse with a duration of about 25 ps which travels up and down the cavity between mirrors 16 and 18. This oscillation is stabilized by two Pockel's cells shown in FIG. 1 as one unit 20. The first Pockel cell of unit 20 is modulated with a RF signal closely adjusted to the round trip time of the cavity. It effectively functions as a timed shutter forcing the oscillator to form a single pulse. The second Pockel's cell in unit 20 introduces a loss into the cavity, which is electronically negatively coupled back to the intensity of the oscillation in the cavity. This allows the oscillator to build up a stable oscillation in about 250 round trips while maintaining a low intensity with a well defined duration and low intensity fluctuation.

Once this pulse is well established, Pockel's cell 22 is activated effectively turning it into a half wave plate. As a result the cavity is switched over to a second branch via polarizers 24 and 26 and curved mirror 31, allowing the oscillator to gain intensity in about 10 round trips and completely deplete the population inversion in the Nd:Yag rod in head 12. In each passage of this pulse, a part is leaked via quarter wave plate 28 and polarizer 26 to mirror 30 and hence provided as a pulse train output 92. The power of the leaked train is about 250 $\mu$J per shot. The optical length of the OPO must be matched to the time interval of the pulses in the pulse train 92. Eventually the pulse in the oscillator gains an energy of about 600 $\mu$J and is dumped via Pockel's cell 32 and polarizers 34 and 36 to the optical path defined by mirrors 38, 40 and 42 into Nd:Yag head 46, which forms a double pass Nd:Yag amplifier with a diameter of 10 mm. The output power at 1064 nm is 80 mJ, the power of the tripled wave at 355 nm is rated at 25 mJ, in a single pulse.

The pulse train from the oscillator is further amplified in a double pass amplifier 11 in FIG. 1. The incident beam 92 is reflected by mirror 100 and the polarization is adjusted with a half wave plate 48. The beam is made divergent with a negative lens 49 to efficiently fill the 8 mm Nd:Yag rod of head 102. The beam is reflected from mirror 105 and passes twice through the rod of head 102 and a quarter wave plate 50. Next, the beam is deflected by polarizer 106 to mirror 108 and rendered parallel with two lenses 52 and the second and third harmonics are generated in two DKDP crystals 110 and 112 with lengths 15 mm (SHG Type 1) and 13 mm (THG Type II) respectively. The 355 nm component of the beam is reflected by harmonic separator 114 to provide the output pulse train. The remainder is delivered to an energy sink 116. Energies of the pulse train at the fundamental wavelength of up to 100 mJ per shot have been observed. At 355 nm an energy up to 40 mJ per shot can be obtained. However, in this setup, pumping two OPO's a pulse power of 12 mJ (6 mJ per OPO) is sufficient. However, it must be understood that very similar OPO's could be pumped by different wavelengths, e.g. 532 nm.

The OPO and OPA Combination of the Invention

According to first principles, the design of the OPO includes two BBO crystals 64a and 66a in a walk off compensating arrangement as diagrammatically shown in FIG. 1. The design of FIG. 1 shows a pair of OPO's and OPA's 15 combined for use in the illustrated embodiment. Therefore, BBO crystals 64b and 66b are also shown. However, it must be expressly understood that a single OPO and OPA 15 can be combined according to the invention. The dimensions of the crystals 64a, 64b, 66a, and 66b are 4×6×12 mm³. The cut angle is 28.5°, suitable for type I parametric generation over the range from 410 nm to 2000 nm. Each crystal is directly mounted on the axis of a stepper gear motor (not shown) allowing the adjustment of the angle of each crystal 64a, 64b, 66a, and 66b individually.

On one end each cavity in each OPO is terminated with a flat mirror, 68a and 68b respectively, which is highly reflective for the visible range. In the illustrated embodiment the pulse train 92 is brought into the cavity through cavity mirrors 68a and 68b, but it is equally possible to introduce the pulse train into the cavity through a notch filter if desired. On the other end of each cavity in each OPO, the cavities are limited with a grazing incidence grating 70a and 70b respectively and a corresponding tuning mirror 72a and 72b respectively. BBO crystals 64a, 66a and 64b, 66b are included within each cavity. The periodicity of the grating 70a and 70b is 1800 grooves/mm, and it is positioned with a 10° angle to the axis of the cavity. The blaze of the grating 70a and 70b is optimized for grazing incidence, maximizing the intensity of the first grating order. The corresponding tuning mirror 72a and 72b directs the diffracted first order back onto the corresponding grating 70a and 70b, completing the cavity in each OPO. In the illustrated embodiment the center of the tuning range of the first order is at 556 nm for a grating with 1800 grooves/mm. For shorter wavelengths 2400 grooves/mm may be used which are centered at about 416 nm. If operation is limited to the red, 1500 grooves/mm centered at about 667 nm may be used. So for producing visible radiation only gratings between 1500 and 2500 grooves/mm make sense. For oscillators to be used in red infrared less grooves per mm should be used, since the center wavelength is about equal to the groove spacing. The 10 degree angle of the grating is a trade off, namely a comprise which obtains sufficient reflection to make cavity oscillation possible, while still obtaining sufficient spectral narrowing. Reducing the angle would make it harder to obtain oscillation and hence fewer roundtrips. Making the angle larger would reduce the resolving power of the grating assembly. This optimum is choice depending on the manufactured characteristics of the grating.

The tuning mirror 72a and 72b is mounted on a rotation stage (not shown) with its axis of rotation positioned under the center of each corresponding grating 70a and 70b, allowing the adjustment of the wavelength without changing the optical length of the oscillator. Each oscillator is folded with two mirrors 74a, 74b and 76a, 76b respectively allowing easy adjustment of the cavity length to match the optical cavity length to the time between the pump pulses. A concave mirror 76a and 76b (Radius 75 cm) is used to ensure optical stability of the cavity. Mirrors 74a and 74b are flat. While the illustrated embodiment had described the use of a concave mirror, it is to be expressly understood that the design could also be rendered using lenses in substitution of the mirror.

Placement of concave mirror 76a and 76b makes the field curved towards the center of the cavity and flat toward its ends. Having a flat wave front both at grating 70a and 70b and at crystals 64a, 66a and 64b, 66b is beneficial for the bandwidth of the oscillator. In the illustrated embodiment the radius of mirror 76a, 76b is about 75 cm. The overall length of the cavity is about 150 cm. The mirror could also be replaced with a lens with a focal length of 37.5 cm to obtain the same functionality. When placed in the center of the cavity the radius of the mirror 76a, 76b must be about half the cavity length. When placed in the center of the cavity the focal length of the lens must be about a quarter of the cavity length. Other arrangement are also possible where the converging element is not placed in the center of the cavity. The concave mirror 76a, 76b can thus be viewed as either forming an image of the beams emerging from crystals 64a, 66a and 64b, 66b toward grating 70a, 70b, or as an element to provide for stability in the cavity.

The diameter of the pump beam 92 from the output of the pulse train amplifier 11 of FIG. 1 is incident on mirrors 82 and 84 and reduced with a 2:1 telescope, symbolically depicted by lenses 86, obtaining a diameter of about 2.5 mm. The beam 92 is reflected by mirror 88 into beam splitter 80 where it is split and directed into the BBO crystals 64a, 66a and 64b, 66b via cavity mirrors 68a and 68b which are transparent for 355 nm. In the illustrated embodiment the cavity mirrors are highly reflective between 400 and 700 nm and transparent at 355 nm. The remnant of the pump beam 92 is coupled out of the cavity with a notch filter 82a and 82b and dumped into an energy sinks 84a and 84b respectively.

The 0th order reflection of gratings 70a and 70b is directed via two mirrors 86a, 88a and 86b, 88b into the OPA crystal 90a and 90b. The single pulse 78 from the pump laser 13 of FIG. 1 is inserted and removed from the optical axis with notch filters 94a, 96a and 94b, 96b. The timing between the pulse train 92 and this single pulse 78 is adjusted with a delay line comprised of mirrors 82, 84 and 88, optimizing the temporal overlap between the last pulse of the OPO in FIG. 1 and the pump pulse 78 for the OPA. The diameter of the pump pulse 78 is adjusted with a 2.5:1 telescope comprised of lenses 98 to 3.5 mm, split by beam splitter 100 and ultimately directed using any needed mirrors 102 into the cavity of the corresponding OPA by notch filter 94a and 94b thereby filling the whole crystal 90a and 90b. The signal is transmitted through notch filter 96a, 96b and the remnant frequencies are reflected into an energy sink 104a, 104b.

The OPO and OPA 15 of FIG. 1 have been assembled on an aluminum base plate with thickness 19 mm which proved to be sufficiently sturdy. Each crystal 64a, 64b, 66a, 66b, 90a, and 90b is mounted on the axis of a backlash compensated stepper gear motor (not shown) allowing the adjustment of the tilt angle with an accuracy of 0.005 degree. Each motor is connected to a dedicated stepper driver and micro controller board (not shown). A similar driver was used to control the motorized stages (Newport SR50PP) used to position the tuning mirrors with an accuracy of 0.001°. All the controller boards are connected via RS485 to a personal computer (not shown). The system is controlled via software written in LabView. The program builds a calibration table for the position of each component versus desired wavelength. The actual positions for each wavelength are obtained through polynomial interpolation. It must be understood that the details of the drivers and the circuits used to control various elements of the system, including the choice of software, is entirely a matter of design choice exercised according to the teachings of the invention.

Bandwidth

Figure 2:
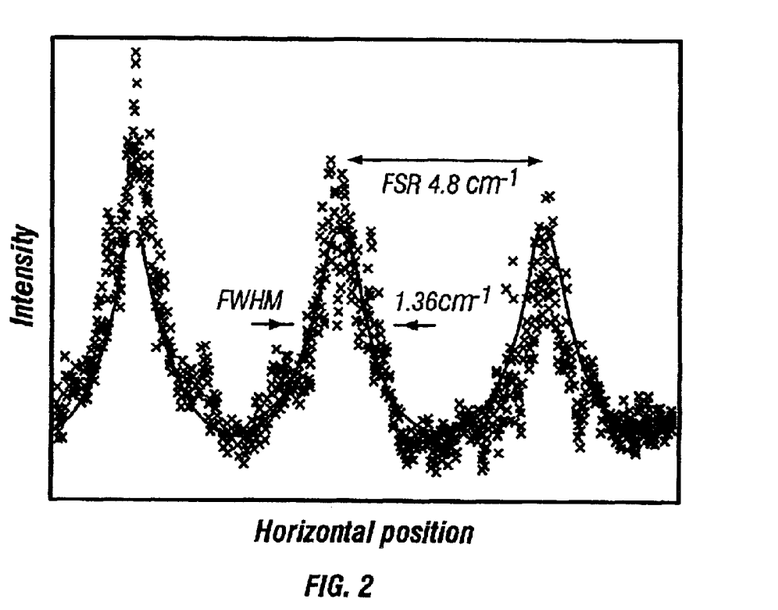
FIG. 2 is a graph of a fringe pattern obtained with a 4.8 $cm^{-1}$ etalon. The signal is recorded with a one dimensional CCD diode array.

The bandwidth of the radiation generated was measured using a thin solid etalon with a free spectral range is 4.8 cm$^{-1}$. The divergent radiation illuminating the etalon was obtained with a diffuser placed close to the etalon. A cross section of the resulting fringe pattern was recorded with a one dimensional CCD diode array. In FIG. 2 the signal of a single shot is presented, with each cross representing a bin of the CCD device. These data points were fitted to an Airy function, using the Levenberg-Marquardt algorithm. The observed full width half maximum (FWHM) bandwidth of the oscillator was found to be 1.36 cm$^{-1}$.

The commonly used definition of the Fourier limit is $\Delta V \Delta T=1$ assuming a pulse with a square temporal profile and spectral distribution within the first zero points of a Sinc function, $\Delta V$ is the bandwidth in Hz and $\Delta T$ is the duration of the pulse in seconds. From this definition, the bandwidth of a pulse with a duration of 25 ps will be larger than 1.33 cm$^{-1}$, remarkably close to the observed limiting value.

Figure 3:
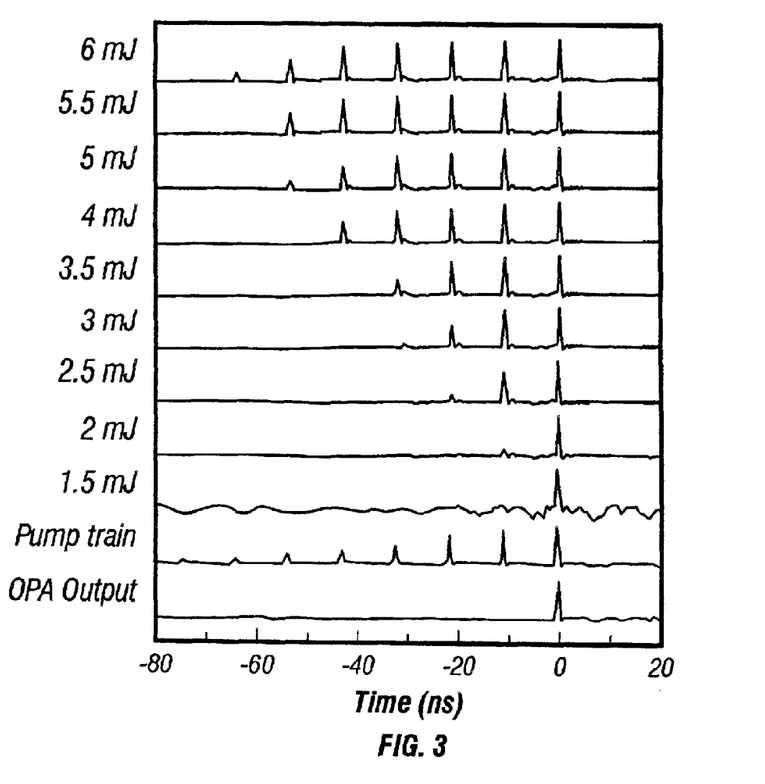
FIG. 3 is a graph of a pulse train produced by the OPO for a number of pump pulse-train energies. Also the pump pulse train itself as the output of the OPA of FIG. 1 is depicted. All signals have been normalized.

The pulse train generated by the oscillator of FIG. 1 was recorded with a fast photo diode and a 1 GHz oscilloscope to produce the traces of FIG. 3. The signals were recorded for pump energy 1.5 mJ (oscillator on threshold) up to 6 mJ per oscillator (close to damage threshold). With increasing power the oscillator of FIG. 1 manages to trigger on earlier pulses in the pump train, resulting in more round trips. It is important both to the bandwidth and the stability of the generated radiation to make as many round trips as possible in the cavity of the OPO of FIG. 1. At a pump energy of 6 mJ seven round trips have been observed. Also, it is clearly seen that the intensity of the pulses in the oscillator of FIG. 1 saturates while the intensity of the pulses in the pump train steadily increases. Earlier observations of a pulse train generated by an oscillator of FIG. 1 containing only one BBO crystal showed a maximum of three round trips at power levels dangerously close to the damage threshold, hence the need for using two crystals in a walk off compensating configuration, as shown in FIG. 1.

The operation of the OPO/OPA combination of FIG. 1 can thus be understood in the context of FIG. 3. Both the pulse train from the OPO of FIG. 1 and the pump train from pump laser 10 of FIG. 1 are combined or mixed in BBO crystal 90a, 90b of the OPA of FIG. 1. The nonlinearity of crystal 90a, 90b, results in the selection of the last pulse from the OPO pulse train of FIG. 1 being amplified and output. The entire optical system is arranged so that the last pulse of the pulse train from the OPO of FIG. 1 arrives in crystal 90a, 90b at the same time as the last pulse of the pump train from laser pump 10 of FIG. 1. This results in the OPA output shown in the bottom graph of FIG. 3, a single, narrow bandwidth, 25 ps pulse.

Multiple round trips of the pulse train in the OPO of FIG. 1 between tuning mirror 72a, 72b and cavity mirror 68a, 68b are important to achieve a narrow bandwidth. With each reflection from grating 70a, 70b, the bandwidth of the pulse is narrowed.

In addition, it is important that the optical cavity in the OPO of FIG. 1 be stable. In most optical cavities the wave fronts are arranged by the optics to be more planar at the center of the cavities than at the end of the cavity. In the preferred embodiment the optics is arranged to provide the more planar wavefronts in the active media, crystals 64a, 64b and 66a, 66b with the flat wave fronts impinging on the cavity end mirrors 72a, 72b, and 68a, 68b. This is implemented by placing the converging element near the center of the cavity rather than placing a curved mirror at its ends. The result of this design is to allow for resonant stability of the cavity.

Output Energy

Figure 4:
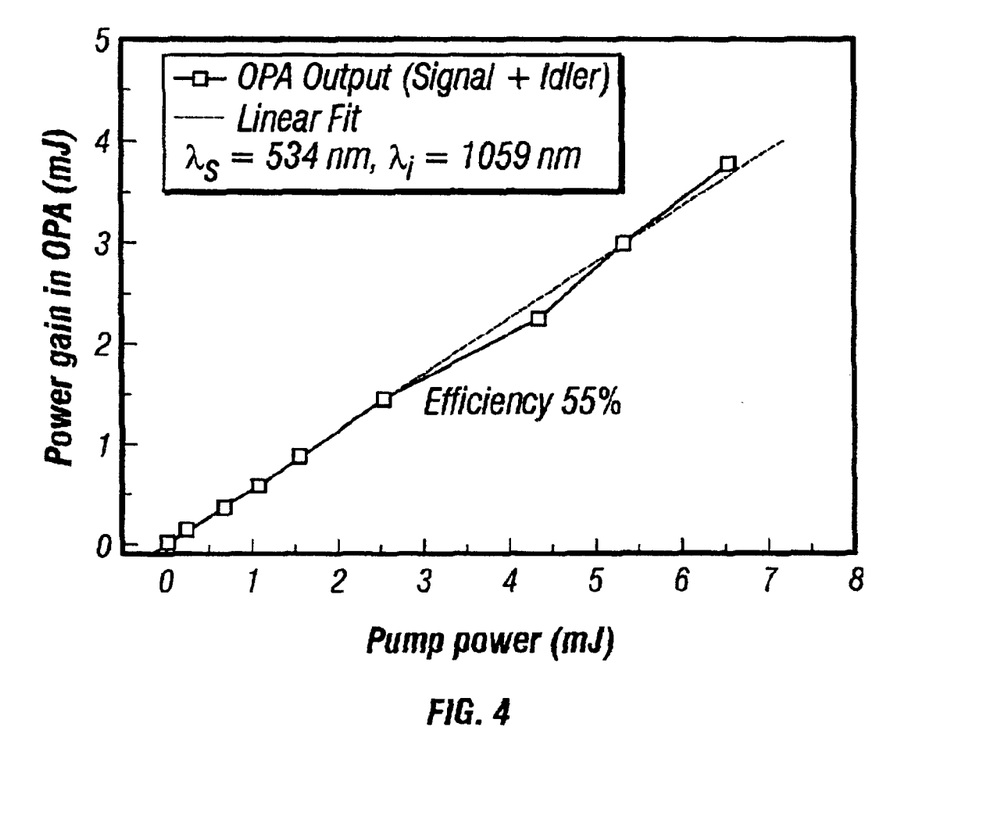
FIG. 4 is a graph of the power of the OPA measured as a function of pump power provided from the laser pump of FIG. 1.

The output power of the OPA of FIG. 1 was measured as a function of pump power as shown in FIG. 4. The diameter of the pump beam at the crystal is 3.5 mm. The power of the pulse train from the oscillator, pumped with a 6 mJ pulse train, is 170 $\mu$J per oscillator. Over the observed range the power gain increases linearly with pump power, and no saturation effect is observed. The conversion efficiency for generating both signal and idler waves determined from the slope of the linear fit to these data points is 55%. The intensity of the output pulse was measured as a function of time as shown in the bottom graph of FIG. 3. The intensity shows a clean single pulse.

Thus, it may be appreciated that an OPO-OPA system specifically tailored to ps spectroscopy and mass spectrometry is possible. The bandwidth of the radiation (1.36 cm$^{-1}$) is close to the Fourier limit and much narrower than the radiation obtained from commercial OPG systems. An output energy of 3.7 mJ per pulse (signal+idler) has been observed, which is ample for the intended applications. The double construction of the illustrated embodiment as shown in FIG. 1 allows us to conduct two color REMPI and pump-probe measurements, although single color measurements are clearly possible.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, a system similar to that describe above can be devised to provide pulses with a different duration depending on modifications to the pump laser. Replacing the Nd:Yag with a Nd:YLF laser will generate shorter pulses of the order of about 10 ps. Incorporating an etalon in the cavity of the Nd:Yag laser will give longer pulses of about 200 ps. The OPO in both cases will generate pulses which are close to the Fourier limit.

For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

I claim:

1. An apparatus for generating narrow bandwidth picosecond optical pulses comprising:
   a picosecond pump laser;
   an picosecond optical parametric oscillator pumped by a picosecond pump pulse train generated by the picosecond pump laser;
   an optical parametric amplifier having an input coupled to an output of the optical parametric oscillator and pumped by the same picosecond pump pulse train generated by the pump laser,
   wherein the optical parametric oscillator comprises an optical cavity comprised of a grating-mirror termination on one end of the cavity and a cavity mirror on an opposing end of the cavity with optically nonlinear active media therebetween.

2. The apparatus of claim 1 where the grating-mirror termination on one end of the cavity is comprised of a grazing incidence grating and a tuning mirror, the grating and mirror being arranged with respect to each other so that a diffracted first order is reflected back from the mirror to the grating and into the cavity.

3. The apparatus of claim 2 where the grazing incidence grating has a period city of about equal to the groove spacing of the grating.

4. The apparatus of claim 2 where the cavity has an axis and where the grazing incidence grating is inclined at an approximately 10° angle with respect to the axis.

5. The apparatus of claim 2 where the grazing incidence grating has a blaze optimized for grazing incidence to maximize a first grating order of diffraction.

6. The apparatus of claim 2 where the cavity has an optical length and where the tuning mirror is rotatable about a center defined about the grating so that the resonant wavelength of the cavity can be adjusted without changing the optical length of the cavity.

7. The apparatus of claim 1 where pulses in the optical parametric oscillator are characterized by a bandwidth and where the pump laser introduces a train of pulses into the optical parametric oscillator of sufficient strength to trigger a multiple number of round trips of pulses in the cavity of the optical parametric oscillator in which each reflection of a pulse from the grating-mirror termination narrows the bandwidth of the pulse.

8. The apparatus of claim 1 where the cavity of the optical parametric oscillator further comprises a concave mirror or lens to image light transmitted to and received from the grating-mirror termination to increase stability of the cavity.

9. The apparatus of claim 8 where the light in the cavity is characterized by a wavefront and where the wavefront at the ends of the cavity, including at the grating-mirror termination, is flat at the ends of the cavity.

10. The apparatus of claim 1 where the grating-mirror termination couples a 0th order diffraction of light from the cavity of the optical parametric oscillator into the optical parametric amplifier.

11. The apparatus of claim 1 where the optically nonlinear active media is comprised of at least one BBO crystal.

12. The apparatus of claim 11 where the optically nonlinear active media is comprised of a pair of BBO crystals arranged with respect to each other in a walk-off compensating arrangement to extend power capability of the optical parametric oscillator.

13. The apparatus of claim 12 where each BBO crystal is independently rotatable to adjust an angular orientation of each BBO crystal in the cavity.

14. The apparatus of claim 13 where the BBO crystal in the cavity is positioned near the end of the cavity, where the light in the cavity is characterized by a wavefront, and where the wavefront at the ends of the cavity, including at the BBO crystal, is flat.

15. The apparatus of claim 1 where the optical parametric oscillator and optical parametric amplifier in combination generate a pulse having a bandwidth characterized by a Fourier limit with the bandwidth of the generated pulse being near the Fourier limit.

16. An apparatus for generating narrow bandwidth picosecond optical pulses comprising:
   a pump laser; an optical parametric oscillator pumped by a pump pulse train generated by the pump laser; and
   an optical parametric amplifier having an input coupled to an output of the optical parametric oscillator and pumped by the pump laser,
   wherein the optical parametric oscillator comprises an optical cavity comprised of a grating-mirror termination on one end of the cavity and a cavity mirror on an opposing end of the cavity with optically nonlinear active media therebetween,
   where the pump laser generates a single pulse, which is input into the optical parametric amplifier to coincide with the last pulse of a pulse train output by the optical parametric oscillator and coupled into the input of the optical parametric amplifier.

17. A method for generating a narrow bandwidth picosecond optical pulse comprising:
   generating a picosecond pump laser pulse train;
   pumping an optical parametric oscillator by the picosecond pump pulse train;

generating a tunable wavelength pulse train output with a narrowed bandwidth and picosecond pulse width from the optical parametric oscillator by use of a grating-mirror termination on one end of a cavity in the optical parametric oscillator and a cavity mirror on an opposing end of the cavity with optically nonlinear active media therebetween;

pumping an optical parametric amplifier having an input coupled to an output of the optical parametric oscillator by a single pulse from the picosecond pump laser; and outputting the narrow bandwidth picosecond optical pulse from the optical parametric amplifier.

18. The method of claim 17 where the grating-mirror termination on one end of the cavity is comprised of a grazing incidence grating and a tuning mirror, and where generating a pulse train output with a narrowed bandwidth and picosecond pulse width generates a diffracted first order reflected back from the mirror to the grating and into the cavity.

19. The method of claim 18 further comprising providing the grazing incidence grating with a periodicity such that the center wavelength is about a groove spacing.

20. The method of claim 18 where the cavity has an axis and further comprising providing the grazing incidence grating with an inclination of an approximately 10° angle with respect to the axis.

21. The method of claim 18 further comprising providing the grazing incidence grating with a blaze optimized for grazing incidence to maximize a first grating order of diffraction.

22. The method of claim 18 where the cavity has an optical length and further comprising rotating the tuning mirror about a center defined about the grating so that wavelength of the cavity can be adjusted without changing the optical length of the cavity.

23. The method of claim 17 where pumping an optical parametric oscillator comprises pumping the optical parametric oscillator with pulses characterized by a bandwidth and sufficient strength to trigger a multiple number of round trips of pulses in the cavity of the optical parametric oscillator in which each reflection of a pulse from the grating-mirror termination narrows the bandwidth of the pulse.

24. The method of claim 17 further comprising stabilizing the cavity of the optical parametric oscillator by providing a concave mirror or lens in the cavity to image light transmitted to and received from the grating-mirror termination to increase stability of the cavity.

25. The method of claim 24 where the light in the cavity is characterized by a wavefront and where stabilizing the cavity of the optical parametric oscillator comprises flattening the wavefront of the light at the grating-mirror termination relative to the wavefront at the center of the cavity.

26. The method of claim 17 where generating a pulse train output with a narrowed bandwidth and picosecond pulse width couples a $0^{th}$ order diffraction of light from the cavity of the optical parametric oscillator into the optical parametric amplifier.

27. The method of claim 17 where generating a pulse train output from the optical parametric oscillator comprises generating the pulse train in at least one BBO crystal.

28. The method of claim 27 where generating a pulse train output from the optical parametric oscillator comprises generating the pulse train in a pair of BBO crystals arranged with respect to each other in a walk-off compensating arrangement to extend power capability of the optical parametric oscillator.

29. The method of claim 28 further comprising independently rotating each BBO crystal to adjust an angular orientation of each BBO crystal in the cavity.

30. The method of claim 29 where independently rotating each BBO crystal rotates each BBO crystal in the cavity at a position near the end of the cavity, where the light in the cavity is characterized by a wavefront, and where the wavefront at the ends of the cavity, including at the BBO crystal, is flat.

31. The method of claim 17 where outputting the narrow bandwidth picosecond optical pulse from the optical parametric amplifier comprises generating a pulse having a bandwidth characterized by a Fourier limit with the bandwidth of the generated pulse being near the Fourier limit.

32. A method for generating a narrow bandwidth picosecond optical pulse comprising:

generating a pump laser pulse train;

pumping an optical parametric oscillator by the pump pulse train;

generating a pulse train output with a narrowed bandwidth and picosecond pulse width from the optical parametric oscillator by use of a grating-mirror termination on one end of a cavity in the optical parametric oscillator and a cavity mirror on an opposing end of the cavity with optically nonlinear active media therebetween;

pumping an optical parametric amplifier having an input coupled to an output of the optical parametric oscillator; and outputting the narrow bandwidth picosecond optical pulse from the optical parametric amplifier, where outputting the narrow bandwidth picosecond optical pulse inputs a single pulse from the pump laser pulse train into the optical parametric amplifier to coincide with the last pulse of a pulse train output by the optical parametric oscillator and coupled into the input of the optical parametric amplifier.

* * * * *

UNITED STATES PATENT AND TRADEMARK OFFICE
CERTIFICATE OF CORRECTION

PATENT NO. : 6,804,044 B2 Page 1 of 1
DATED : October 12, 2004
INVENTOR(S) : Wytze Eeuwke Van Der Veer It is certified that error appears in the above-identified patent and that said Letters Patent is hereby corrected as shown below:

Column 1,
Line 5, insert
-- This invention was made with the Government support under Grant No. 997482, awarded by the National Science Foundation. The Government has certain rights in this invention. --

Signed and Sealed this

Twenty-second Day of February, 2005

JON W. DUDAS
*Director of the United States Patent and Trademark Office*